US012360698B2

(12) United States Patent
Li et al.

(10) Patent No.: US 12,360,698 B2
(45) Date of Patent: *Jul. 15, 2025

(54) IMPLICIT ORDERED COMMAND HANDLING

(71) Applicant: Micron Technology, Inc., Boise, ID (US)

(72) Inventors: Huachen Li, Shanghai (CN); Zhou Zhou, Shanghai (CN); Chaofeng Zhang, Shanghai (CN); Jianfeng Li, Shanghai (CN); Chen Huang, Shanghai (CN); Lin Huang, Shanghai (CN); Wei Li, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,025

(22) Filed: Apr. 25, 2024

(65) Prior Publication Data
US 2024/0345759 A1    Oct. 17, 2024

Related U.S. Application Data

(63) Continuation of application No. 17/283,210, filed as application No. PCT/CN2021/076691 on Feb. 18, 2021, now Pat. No. 11,995,337.

(51) Int. Cl.
G06F 3/06    (2006.01)
(52) U.S. Cl.
CPC .......... *G06F 3/0652* (2013.01); *G06F 3/0604* (2013.01); *G06F 3/0659* (2013.01); *G06F 3/0679* (2013.01)
(58) Field of Classification Search
CPC ..... G06F 3/0652; G06F 3/0611; G06F 3/0659
See application file for complete search history.

(56) References Cited

U.S. PATENT DOCUMENTS 9,400,749 B1    7/2016  Kuzmin et al.
2003/0217239 A1  11/2003  Jeddeloh
(Continued)

FOREIGN PATENT DOCUMENTS

| CN | 1851669 A | 10/2006 |
| CN | 101562045 A | 10/2009 |
| CN | 101788963 A | 7/2010 |

OTHER PUBLICATIONS

ISA/CN, "International Search Report and Written Opinion of the International Searching Authority," issued in connection with Int'l Appl. No. PCT/CN2021/076691, dated Sep. 28, 2021 (5 pages).

*Primary Examiner* — Hosain T Alam
*Assistant Examiner* — Nicholas A. Paperno
(74) *Attorney, Agent, or Firm* — Holland & Hart LLP

(57) ABSTRACT

Methods, systems, and devices for improved implicit ordered command handling are described. For instance, a memory device may receive, from a host device, a first command and a second command. The memory device may determine whether a first memory operation associated with the first command and a second memory operation associated with the second command are to be performed in an order relative to each other based on a first time when the first command is received relative to a second time when the second command is received. The memory device may select whether to perform a first memory access procedure or a second memory access procedure based on whether the first memory operation and the second memory operation are a same type of memory operation and on whether the first memory operation and the second memory operation are to be performed in the order relative to each other.

20 Claims, 6 Drawing Sheets

(56) References Cited

U.S. PATENT DOCUMENTS

2015/0325288 A1 11/2015 Balluchi et al.
2021/0294758 A1 9/2021 Ganon et al.

IMPLICIT ORDERED COMMAND HANDLING

CROSS REFERENCE

The present Application for Patent is a continuation of U.S. patent application Ser. No. 17/283,210 by Li et al., entitled "IMPROVED IMPLICIT ORDERED COMMAND HANDLING," filed Apr. 6, 2021, which is a 371 national phase filing of International Patent Application No. PCT/CN2021/076691 by Li et al., entitled "IMPROVED IMPLICIT ORDERED COMMAND HANDLING," filed Feb. 18, 2021, each of which is assigned to the assignee hereof, and each of which is expressly incorporated by reference in its entirety herein.

FIELD OF TECHNOLOGY

The following relates generally to one or more systems for memory and more specifically to improved implicit ordered command handling.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A memory device may receive a command from a host device. The memory device may identify an aspect (e.g., an attribute) of the command to determine whether an order in which the command relative to other commands is performed may be independent of the other commands received at the memory device (e.g., a simple command) or whether the order is dependent on the other commands (e.g., an ordered command). In some examples where the attribute of the command indicates that the command is a simple command (e.g., may be independent of the other commands), the memory device may still determine that there is an implicit ordering between the command and one or more other received commands. For instance, commands may be executed in the order that they are received, even if multiple outstanding commands to be executed are simple commands. In such examples, the memory device may perform each command in order with no overlap between them.

There may be some examples, however, where a memory device may execute one or more steps associated with the simple command at a related time (e.g., during at least partially overlapping times, at a same time, in tandem with) one or more steps associated with the one or more other received commands. By executing the one or more steps associated with the simple command the related time (e.g., during at least partially overlapping times, at a same time, in tandem with) as the one or more steps associated with the one or more other received commands, the memory device may reduce a total duration associated with performing the simple command and the one or more other received commands. The present disclosure may relate to one or more criteria that a memory device may use to determine whether one or more steps associated with executing a simple command may overlap, at least partially, in time with one or more steps associated with the one or more other received commands.

Features of the disclosure are initially described in the context of systems as described with reference to FIG. 1. Features of the disclosure are described in the context of a decision flow and timing diagrams as described with reference to FIGS. 2-4B. These and other features of the disclosure are further illustrated by and described with reference to an apparatus diagram and flowcharts that relate to improved implicit ordered command handling as described with reference to FIGS. 5-6.

Figure 1:
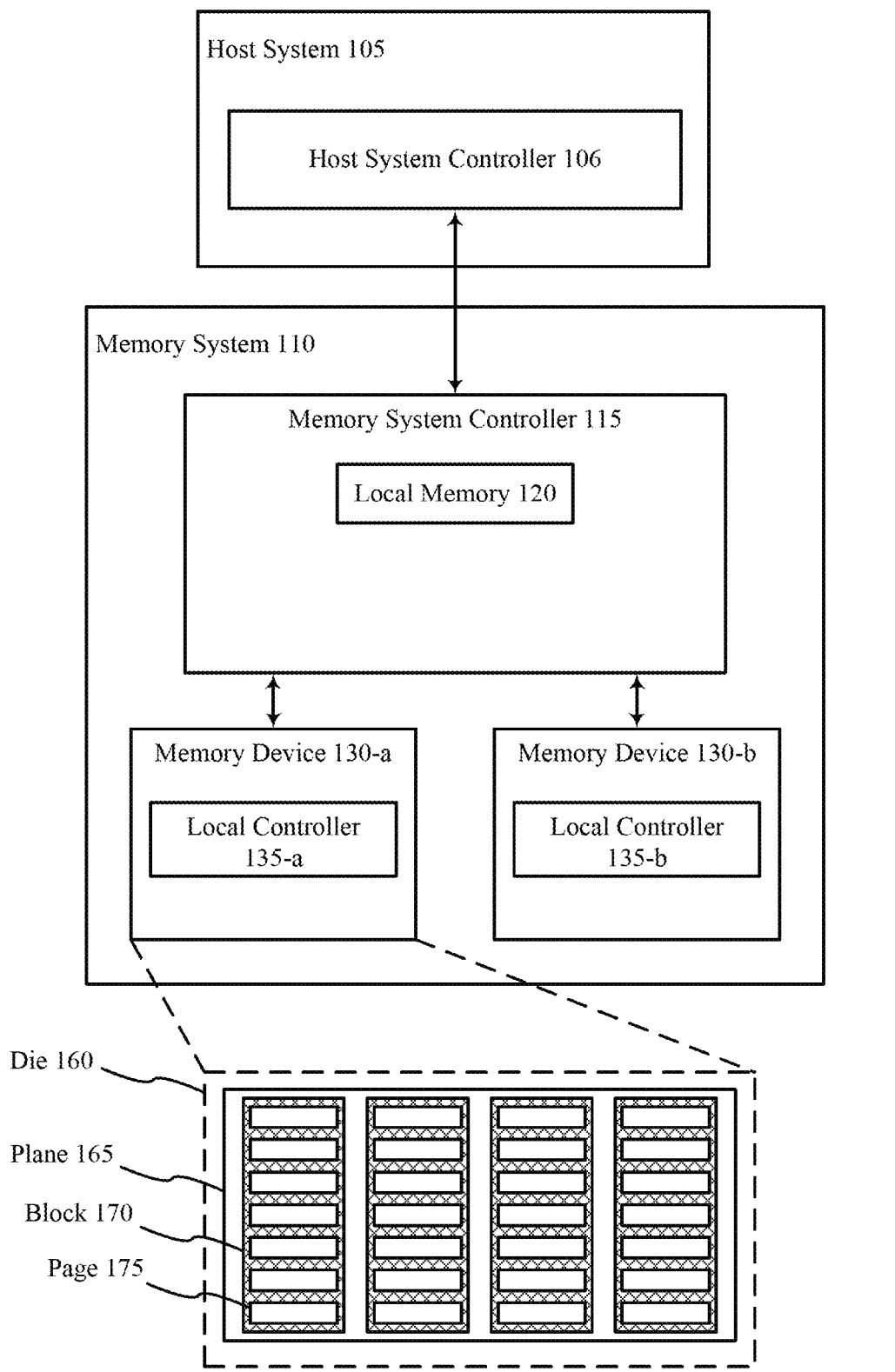
FIG. 1 illustrates an example of a system that supports improved implicit ordered command handling in accordance with examples as disclosed herein.

FIG. 1 illustrates an example of a system 100 that supports improved implicit ordered command handling in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB)

flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be instead of erasing and rewriting the entire old block 170 due to latency or wear considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for each of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support improved implicit ordered command handling. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, a memory system 110 may receive a command from a host system 105. The memory system 110 may identify an aspect, such as an attribute, of the command to determine whether an order in which the command is performed may be independent of other commands received at the memory system 110 (e.g., a simple command) or whether the order is dependent on other commands (e.g., an ordered command). In some examples where the aspect (e.g., attribute) of the command indicates that the command is a simple command, the memory system 110 may still determine that there is an implicit ordering between the command and one or more other received commands. For instance, commands may be executed in the order that they are received, even if multiple outstanding commands to be executed are simple commands. In such examples, the memory system 110 may perform each command in order with no overlap between them.

However, there may be some examples where a memory system 110 may execute one or more steps associated with the simple command at the same time as (e.g., (e.g., during at least partially overlapping times, at a same time, in tandem with)) one or more steps associated with the one or more other received commands. By executing the one or more steps associated with the simple command at the same time as the one or more steps associated with the one or more other received commands, the memory system 110 may reduce a total duration associated with performing the simple command and the one or more other received commands. The present disclosure may relate to one or more criteria that a memory may use to determine whether one or more steps associated with executing a simple command may at least partially overlap in time with one or more steps associated with the one or more received commands.

Figure 2:
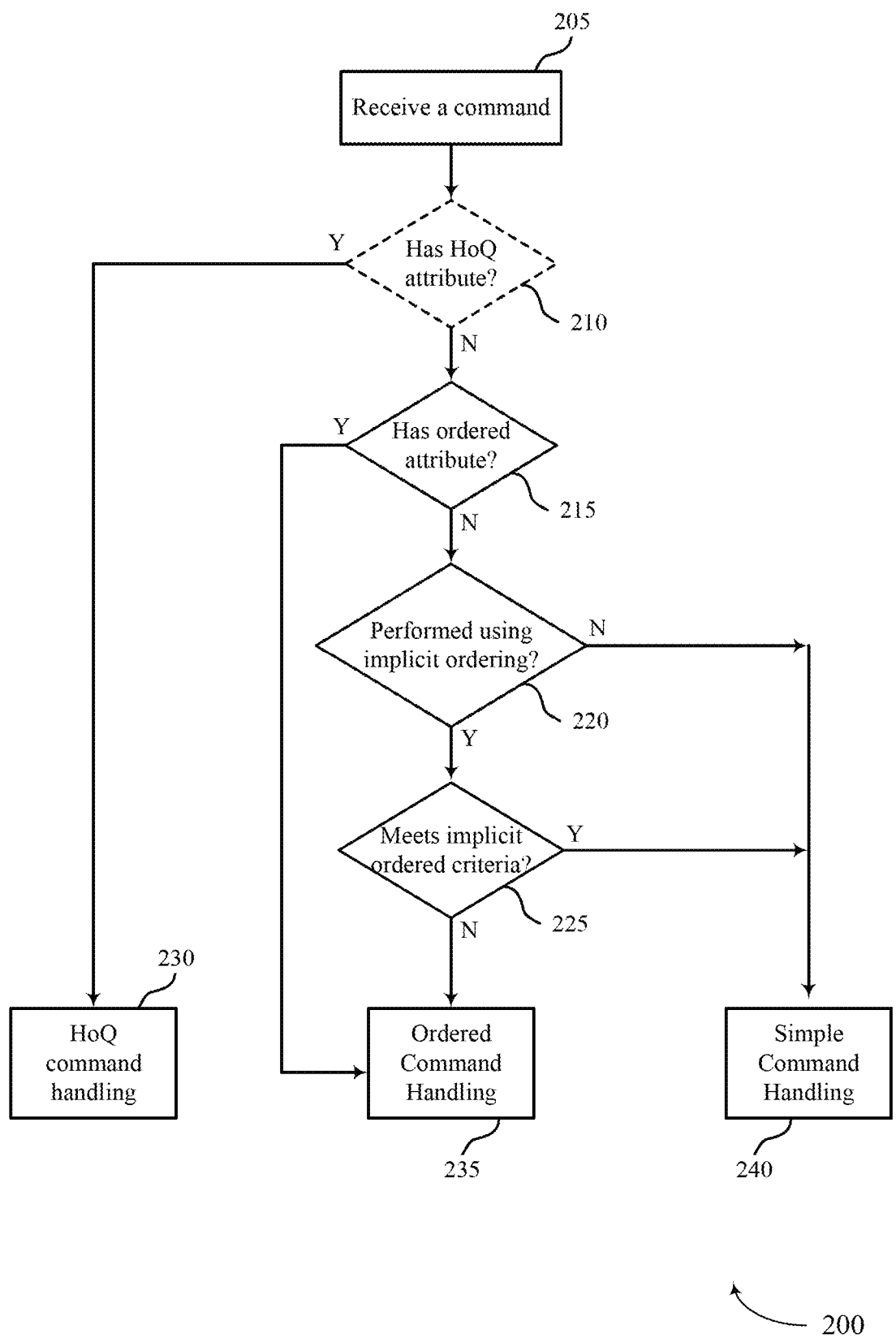
FIG. 2 illustrates an example of a decision flow that supports improved implicit ordered command handling in accordance with examples as disclosed herein.

FIG. 2 illustrates an example of a decision flow 200 that supports improved implicit ordered command handling in accordance with examples as disclosed herein. Although the present example is described in the context of a memory system, in some examples the methods may be performed by one or more subcomponents of the memory system, for examples, a task manager of the memory system, a memory device (e.g., memory device 130-a as described with reference to FIG. 1) or a controller (e.g., memory system controller 115 as described with reference to FIG. 1), or other component(s), or any combination thereof. Aspects of the decision flow 200 may be implemented by a controller, among other components. Additionally or alternatively, aspects of the decision flow 200 may be implemented as instructions stored in memory (e.g., firmware stored in a memory coupled with memory system 110). For example, the instructions, when executed by a controller (e.g., the memory system controller 115) may cause the controller to perform the operations of the decision flow 200. A memory system may operate according to one or more aspects of decision flow 200 in order to more quickly execute commands that meet one or more fast implicit ordering criteria.

At 205, a command may be received. For instance, a memory system (e.g., a memory system 110 as described with reference to FIG. 1) may receive a command from a host system (e.g., a host system 105 as described with reference to FIG. 1). In some examples, the command may be received at a controller (e.g., a memory system controller 115) of the memory system.

At 210, whether the command received at 205 has an aspect, such as an attribute, indicating that the command is to be at the head of the queue may be determined. For instance, the memory system may determine whether the command received at 205 has an attribute indicating that the command is to be at the head of the queue (e.g., the command is to be performed next irrespective of the other commands already received by the memory system). If not, the memory system may proceed to 215. If so, the memory system may proceed to 230. At 230, a head of the queue (HoQ) command handling may be performed. For instance, the memory system may perform head of the queue command handling, which may include the memory system performing the command at the head of a queue irrespective of whether the memory system already has other commands to execute from the host system in the queue. In some examples, whether the command has the aspect (e.g., attribute) may be determined by a controller (e.g., a memory system controller 115) of the memory system. In some examples, head of the queue command handling may be performed by a controller (e.g., a memory system controller 115) of the memory system.

At 215, an aspect, such as an attribute, of the command may be identified to determine whether an order in which the command is performed may be independent of other commands or whether the order is dependent on other commands may be determined. For instance, the memory system may identify an attribute of the command to determine whether an order in which the command is performed may be independent of other commands received at the memory system 110 (e.g., a simple command) or whether the order is dependent on other commands (e.g., an ordered command). In some examples, if a set of two bits associated with the command (e.g., bits 0 and 1) indicate a '00', the command may be a simple command; if the two bits indicate a '01', the command may be an ordered command; and if the two bits indicate a '10', the command may be a head of the queue command (e.g., a command executed according to 230). Other combinations of bits to represent ordered, simple, and head of the queue commands are possible without deviating from the scope of the present disclosure. If the memory system determines that the command is a simple command, the memory system may proceed to 220. However, if the memory system determines that the command is an ordered command, the memory system may proceed to 235. In some examples, the attribute of the command may be identified by a controller (e.g., a memory system controller 115) of the memory system.

In some examples, a command that has the simple task attribute may be sent to a task set and may not be enabled to request processing by a device server until each command having a head of queue task attribute and older commands (e.g., commands received before the command that has the simple task attribute) having an ordered task attribute in the task set have completed. Additionally or alternatively, commands that have the ordered task attribute may be sent to the task set and may not be enabled to request processing by the device server until each command having the head of queue task attribute and each older command (e.g., commands received before the command that has the ordered task attribute) in the task set have completed.

In some examples, the methods of 205 and 210 may occur at a same time or may be combined into a single step. For instance, a same set of bits that indicates whether a command is simple or ordered may also indicate whether the command is an HoQ command. Accordingly, in such examples, the memory system may identify or determine whether an aspect, such as an attribute, of the command indicates whether a command is a simple command, an ordered command, or an HoQ command. If the command is an HoQ command, the memory system may proceed to 230. If the command is an ordered command, the memory system may proceed to 235. If the command is a simple command, the memory system may proceed to 220.

At 220, whether there is an implicit ordering between the command one or more other received commands may be determined. For instance, the memory system may determine whether there is an implicit ordering between the command and one or more other received commands. For instance, the memory system may determine whether a first memory operation associated with the command and a second memory operation associated with a second command are to be performed in an order relative to each other based on or in response to a first time at which the command is received relative to a second time at which the second command is received. If the memory system determines that there is an implicit ordering, the memory system may proceed to 225. If not, the memory system may proceed to 240. In some examples, whether there is implicit ordering may be determined by a controller (e.g., a memory system controller 115) of the memory system.

At 225, whether the commands meets one or more criteria may be determined. For instance, the memory system may determine whether the command meets one or more criteria. The one or more criteria may include the attribute of the command being simple (e.g., identifying a field of the command that indicates that the command is a simple command), the memory system determining that the command has implicit ordering (e.g., determining that commands are to be performed in the order that they are received), the command and any outstanding commands (e.g., the one or more other received commands) being associated with a same memory operation (e.g., both commands indicating to perform an UNMAP operation, a WRITE BUFFER operation, or a MODE SELECT operation), determining that the command is not to be re-ordered (e.g., identifying, via a command handler, an indication that the command is not to be re-ordered relative to other outstanding commands), or any combination thereof. For instance, the memory system may determine whether a first memory operation associated with the command and a second memory operation associated with a second command are a same type of memory operation. Additionally or alternatively, one criteria may involve the memory system operating in a first mode (e.g., a benchmark mode, which, in some examples, may be a mode in which the memory system has one single type of outstanding commands to execute) as opposed to a second mode (e.g., a mixed commands mode, which, in some examples, may be a mode in which the memory system has more than one type of command to execute). Operating in the benchmark mode may involve there being one type of outstanding command at the memory system or a capability to execute several steps of a second command before finishing the execution of a first command (e.g., before transmitting an indication that the first command has executed), whereas operating in a benchmark mode may involve there being different types of outstanding commands at the memory system (e.g., one command for performing an UNMAP operation and one command for performing a MODE SELECT operation) or lacking the capability to executed several steps of the second command before finishing execution of the first command. If the memory system determines that the command meets each of the one or more criteria, the memory system may proceed to 235. If not, the memory system may proceed to 240. The memory system may select whether to perform a first memory access procedure (e.g., ordered command handling) or a second memory access procedure (e.g., simple command handling) based on or in response to whether the first memory operation and the second memory operation are a same type of memory operation and on whether the first memory operation and the second memory operation are to be performed in the order relative to each other. In some examples, whether the commands meets one or more criteria may be determined by a controller (e.g., a memory system controller 115) of the memory system.

At 235, ordered command handling may be performed. For instance, the memory system may perform ordered command handling. Examples of ordered command handling may be described herein, for example, with reference to FIGS. 3A and 4A, among other sections. In some examples, ordered command handling may be performed by a controller (e.g., a memory system controller 115) of the memory system.

At 240, simple command handling may be performed. For instance, the memory system may perform simple command handling. Examples of simple command handling in which commands have an implicit order (e.g., if the memory system is proceeding from 225 to 240) may be described herein, for example with reference to FIGS. 3B and 4B, among other sections. In some examples, simple command handling may be performed by a controller (e.g., a memory system controller 115) of the memory system.

In some examples, the methods as described herein may be associated with one or more advantages. For instance, by determining at 225 that a command meets the one or more implicit ordering criteria, the memory system may execute the command and a second outstanding command (e.g., associated with a same type of memory access procedure) more quickly than executing the command and the second command according to ordered command handling. As such, the memory system may execute the command and the second command more efficiently, among other advantages.

Figure 3A:
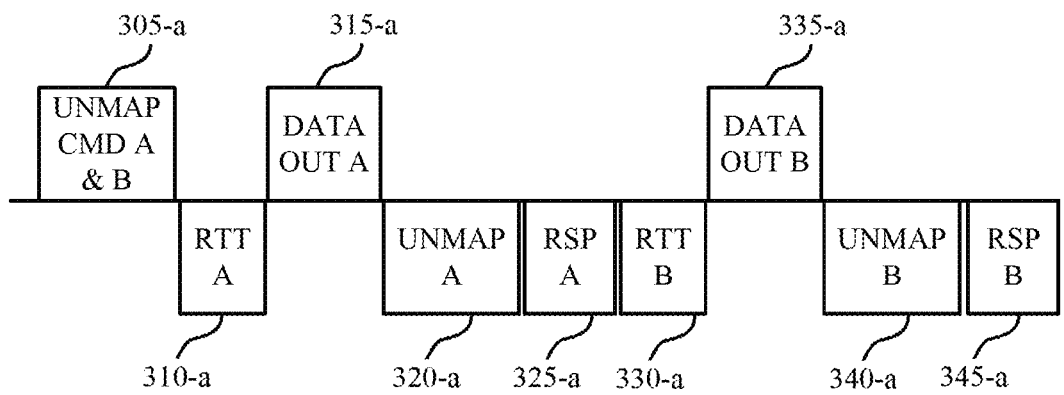
FIGS. 3A and 3B illustrate examples of timing diagrams that support improved implicit ordered command handling in accordance with examples as disclosed herein.
Figure 3B:
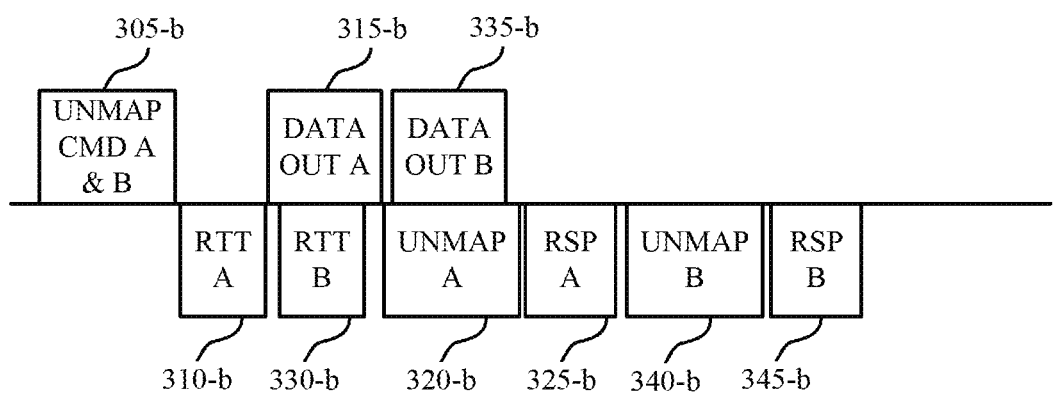

FIGS. 3A and 3B illustrate examples of timing diagrams 300-*a* and 300-*b* that support improved implicit ordered command handling in accordance with examples as disclosed herein. Although the present example is described in the context of a memory system, in some examples the methods may be performed by a memory device (e.g., memory device 130-*a* as described with reference to FIG. 1), or a controller (e.g., memory system controller 115 as described with reference to FIG. 1), or other component(s), or any combination thereof. In some examples, the memory system may execute commands according to timing diagram 300-*a* if operating in a first mode (e.g., a mixed commands mode) and may execute commands according to timing diagram 300-*b* if operating in a second mode (e.g., a benchmark mode).

Timing diagram 300-*a* may correspond to an instance where ordered command handling occurs (e.g., ordered command handling at 235 as described with reference to FIG. 2). During duration 305-*a*, a memory system (e.g., a memory system 110 as described with reference to FIG. 1) may receive a first command (i.e., command A) and a second command (i.e., command B) from a host system (e.g., a host system 105 as described with reference to FIG. 1). The first command may indicate to erase one or more first bits at one or more first addresses of an address space and the second command may indicate to erase one or more second bits at one or more second addresses of the address space.

During duration 310-*a*, the memory system may transmit, to the host system, a request for one or more parameters associated with erasing the one or more first bits at the one or more first addresses of the address space. For instance, the memory system may indicate, to the host system, a ready to transfer (RTT) universal flash storage (UFS) protocol information unit (UPIU) associated with command A. During duration 315-*a*, the host system may transmit, to the memory system, the one or more parameters associated with erasing the one or more first bits at the one or more first addresses of the address space. During duration 320-*a*, the memory system may erase, from the memory system, the one or more first bits from the one or more first addresses of the address space. During duration 325-*a*, the memory system may transmit, to the host system, a first indication that the one or more first bits have been erased.

During duration 330-*a*, the memory system may transmit, to the host system, a request for one or more parameters associated with erasing the one or more second bits at the one or more second addresses of the address space. For instance, the memory system may indicate, to the host system, an RTT UPIU associated with command B. During duration 335-*a*, the host system may transmit, to the memory system, the one or more parameters associated with erasing the one or more second bits at the one or more second addresses of the address space. During duration 340-*a*, the memory system may erase, from the memory system, the one or more second bits from the one or more second addresses of the address space. During duration 345-*a*, the memory system may transmit, to the host system, a second indication that the one or more second bits have been erased. In some examples, one or more of durations 310-*a*, 315-*a*, 320-*a*, 325-*a*, 330-*a*, 335-*a*, 340-*a*, and 345-*a* may at least partially overlap in time with durations 305-*a*, 310-*a*, 315-*a*, 320-*a*, 325-*a*, 330-*a*, 335-*a*, or 340-*a*, respectively.

Timing diagram 300-*b* may represent an instance where simple command handling occurs for a command that is determined to have implicit ordering (e.g., at which the memory system proceeds to 240 from 225 in FIG. 2). During duration 305-*b*, a memory system (e.g., a memory system 110 as described with reference to FIG. 1) may receive a first command (i.e., command A) and a second command (i.e., command B) from a host system (e.g., a host system 105 as described with reference to FIG. 1). The first command may indicate to erase one or more first bits at one or more first addresses of an address space and the second command may indicate to erase one or more second bits at one or more second addresses of the address space.

During duration 310-*b*, the memory system may transmit, to the host system, a request for one or more parameters associated with erasing the one or more first bits at the one or more first addresses of the address space. For instance, the memory system may indicate, to the host system, a ready to transfer (RTT) UPIU associated with command A. During duration 315-*b*, the host system may transmit, to the memory system, the one or more parameters associated with erasing the one or more first bits at the one or more first addresses of the address space. During duration 330-*b*, the memory system may transmit, to the host system, a request for one or more parameters associated with erasing the one or more second bits at the one or more second addresses of the address space. Duration 330-*b* may overlap with duration 315-*b* at least partially in time.

During duration 320-*b*, the memory system may erase, from the memory system, the one or more first bits from the one or more first addresses of the address space. During duration 335-*b*, the host system may transmit, to the memory system, the one or more parameters associated with erasing the one or more second bits at the one or more second addresses of the address space. Duration 320-*b* may overlap with duration 335-*b* at least partially in time. During duration 325-*b*, the memory system may transmit, to the host system, a first indication that the one or more first bits have been erased. During duration 340-*b*, the memory system may erase, from the memory system, the one or more second bits from the one or more second addresses of the address space. During duration 345-*b*, the memory system may transmit, to the host system, a second indication that the one or more second bits have been erased. In some examples, duration 305-*b* may at least partially overlap in time with duration 310-*b*, one or more of durations 330-*b* or 315-*b* may at least partially overlap in time with duration 310-*b*, one or more of durations 335-*b* or 230-*b* may at least partially overlap in time with one or more of durations 320-*b* or 335-*b*, duration 325-*b* may at least partially overlap in time with duration 320-*b*, duration 340-*b* may at least partially overlap in time with duration 325-*b*, duration 345-*b* may at least partially overlap in time with duration 340-*b*, or any combination thereof.

In FIG. 3B, duration 330-*b* may overlap at least partially with duration 315-*b* and duration 335-*b* may overlap at least partially with duration 325-*b* in time. However, in FIG. 3A, duration 330-*a* may be nonoverlapping in time with duration 315-*a* and duration 335-*a* may be non-overlapping in time with duration 325-*a*. Accordingly, a memory system operating according to timing diagram 300-*b* may execute commands A and B more quickly than a memory system operating according to timing diagram 300-*a*.

Figure 4A:
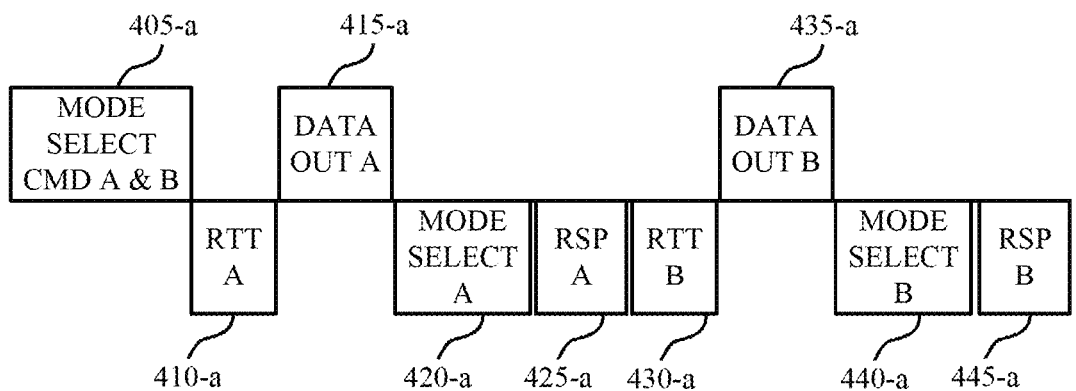
FIGS. 4A and 4B illustrate examples of timing diagrams that support improved implicit ordered command handling in accordance with examples as disclosed herein.
Figure 4B:
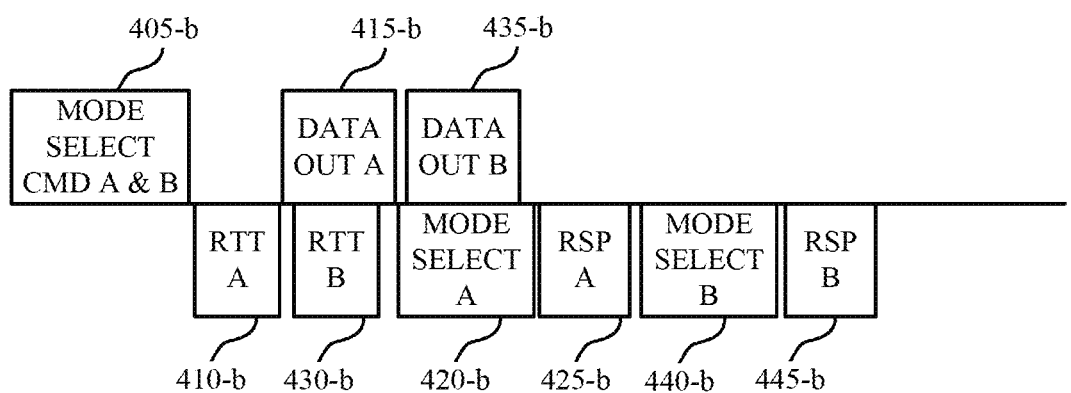

FIGS. 4A and 4B illustrate examples of timing diagrams 400-*a* and 400-*b* that support improved implicit ordered command handling in accordance with examples as disclosed herein. Although the present example is described in the context of a memory system, in some examples the methods may be performed by a memory device (e.g., memory device 130-*a* as described with reference to FIG. 1) or a controller (e.g., memory system controller 115 as described with reference to FIG. 1), or other component(s), or any combination thereof. In some examples, the memory system may execute commands according to timing diagram 400-*a* if operating in a first mode (e.g., a mixed commands mode) and may execute commands according to timing diagram 400-*b* if operating in a second mode (e.g., a benchmark mode).

Timing diagram 400-*a* may correspond to an instance where ordered command handling occurs (e.g., ordered command handling at 235 as described with reference to FIG. 2). During duration 405-*a*, a memory system (e.g., a memory system 110 as described with reference to FIG. 1) may receive a first command (i.e., command A) and a second command (i.e., command B) from a host system (e.g., a host system 105 as described with reference to FIG. 1). The first command may indicate to configure a first mode for one or more first addresses of an address space and the second command may indicate to configure a second mode for one or more second addresses of the address space.

During duration 410-*a*, the memory system may transmit, to the host system, a request for one or more parameters associated with configuring the first mode for the one or more first addresses of the address space. For instance, the memory system may indicate, to the host system, a ready to transfer (RTT) UPIU associated with command A. During duration 415-*a*, the host system may transmit, to the memory system, the one or more parameters associated with configuring the first mode for the one or more first addresses of the address space. During duration 420-*a*, the memory system may configure, at the memory system, the first mode for the one or more first addresses of the address space. During duration 425-*a*, the memory system may transmit, to the host system, a first indication that the first mode has been configured.

During duration 430-*a*, the memory system may transmit, to the host system, a request for one or more parameters associated with configuring the second mode for the one or more second addresses of the address space. For instance, the memory system may indicate, to the host system, an RTT UPIU associated with command B. During duration 435-*a*, the host system may transmit, to the memory system, the one or more parameters associated with configuring the second mode for the one or more second addresses of the address space. During duration 440-*a*, the memory system may configure, at the memory system, the second mode for the one or more second addresses of the address space. During duration 445-*a*, the memory system may transmit, to the host system, a second indication that the second mode has been configured. In some examples, one or more of durations 410-*a*, 415-*a*, 420-*a*, 425-*a*, 430-*a*, 435-*a*, 440-*a*, and 445-*a* may at least partially overlap in time with durations 405-*a*, 410-*a*, 415-*a*, 420-*a*, 425-*a*, 430-*a*, 435-*a*, or 440-*a*, respectively.

Timing diagram 400-*b* may represent an instance where simple command handling occurs for a command that is determined to have implicit ordering (e.g., at which the memory system proceeds to 240 from 225 in FIG. 2). During duration 405-*b*, a memory system (e.g., a memory system 110 as described with reference to FIG. 1) may receive a first command (i.e., command A) and a second command (i.e., command B) from a host system (e.g., a host system 105 as described with reference to FIG. 1). The first command may indicate to configure a first mode for one or more first addresses of an address space and the second command may indicate to configure a second mode for one or more second addresses of the address space.

During duration 410-*b*, the memory system may transmit, to the host system, a request for one or more parameters associated with configuring the first mode for the one or more first addresses of the address space. For instance, the memory system may indicate, to the host system, a ready to transfer (RTT) UPIU associated with command A. During duration 415-*b*, the host system may transmit, to the memory system, the one or more parameters associated with configuring the first mode for the one or more first addresses of the address space. During duration 430-*b*, the memory system may transmit, to the host system, a request for one or more parameters associated with configuring the second mode for the one or more second addresses of the address space. Duration 430-*b* may overlap with duration 415-*b* at least partially in time.

During duration 420-*b*, the memory system may configure, at the memory system, the first mode for the one or more first addresses of the address space. During duration 435-*b*, the host system may transmit, to the memory system, the one or more parameters associated with configuring the second mode for the one or more second addresses of the address space. Duration 420-*b* may overlap with duration 435-*b* at least partially in time. During duration 425-*b*, the memory system may transmit, to the host system, a first indication that the first mode has been configured. During duration 440-*b*, the memory system may configure, at the memory system, the second mode for the one or more second addresses of the address space. During duration 445-*b*, the memory system may transmit, to the host system, a second indication that the second mode has been configured. In some examples, duration 405-*b* may at least partially overlap in time with duration 410-*b*, one or more of durations 430-*b* or 415-*b* may at least partially overlap in time with duration 410-*b*, one or more of durations 435-*b* or 230-*b* may at least partially overlap in time with one or more of durations 420-*b* or 435-*b*, duration 425-*b* may at least partially overlap in time with duration 420-*b*, duration 440-*b* may at least partially overlap in time with duration 425-*b*, duration 445-*b* may at least partially overlap in time with duration 440-*b*, or any combination thereof.

In FIG. 4B, duration 430-*b* may overlap at least partially with duration 415-*b* and duration 435-*b* may overlap at least partially with duration **425-*b* in time. However, in FIG. 4A, duration 430-*a* may be nonoverlapping in time with duration 415-*a* and duration 435-*a* may be non-overlapping in time with duration 425-*a*. Accordingly, a memory system operating according to timing diagram 400-*b* may execute commands A and B more quickly than a memory system operating according to timing diagram 400-*a***.

FIGS. 3A and 3B may correspond to commands associated with a first memory access procedure (e.g., UNMAP commands) and FIGS. 4A and 4B may correspond to commands associated with a second memory access procedure (e.g., MODE SELECT commands). However, the methods as described herein (e.g., with regards to one or more of FIGS. 3A, 3B, 4A, and 4B) may additionally or alternatively be applied to commands associated with other memory access procedures. For instance, the methods as described herein may be used for commands associated with a WRITE BUFFER memory access procedure.

Figure 5:
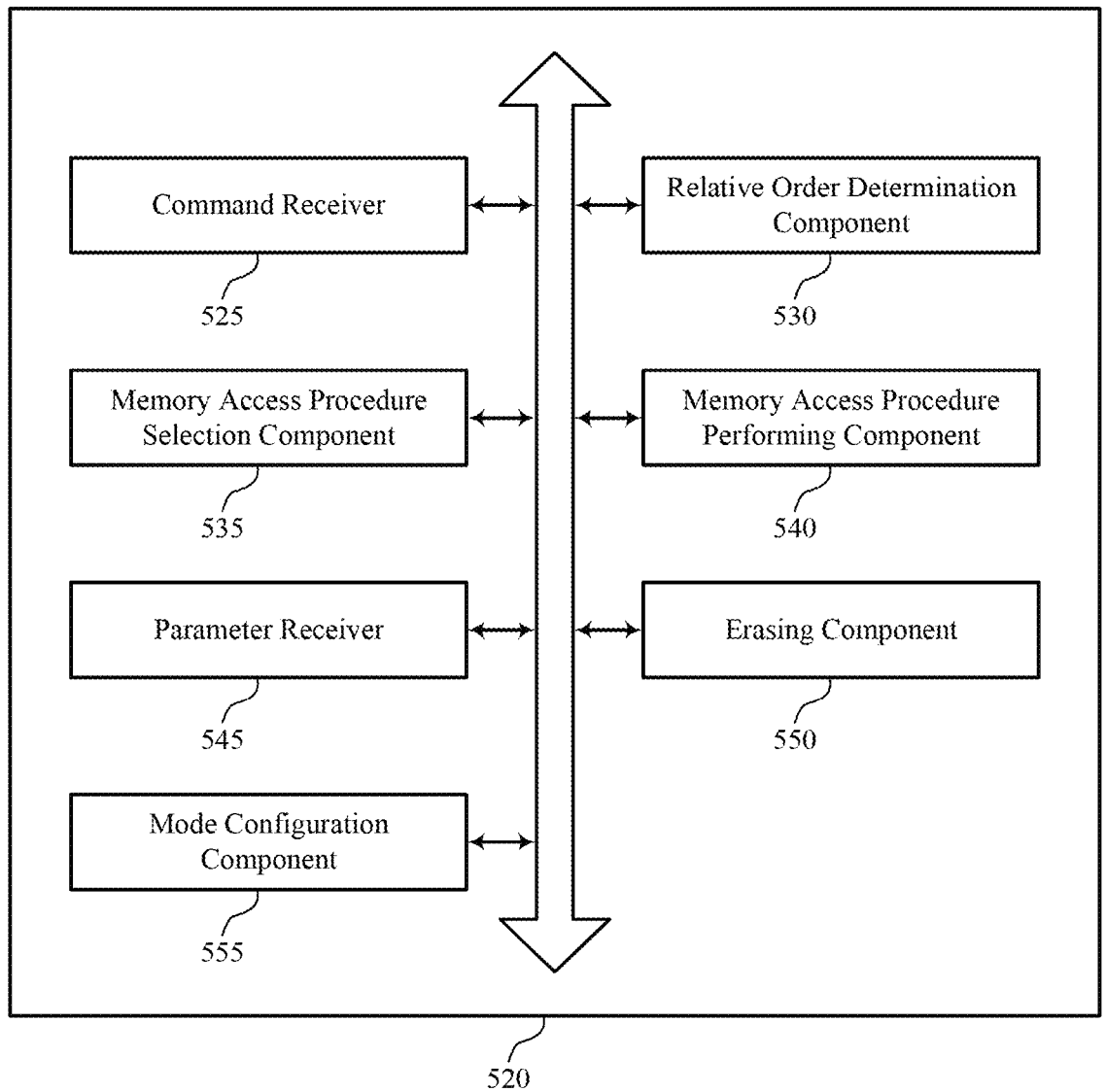
FIG. 5 shows a block diagram of a memory device that supports improved implicit ordered command handling in accordance with examples as disclosed herein.

FIG. 5 shows a block diagram 500 of a memory device 520 that supports improved implicit ordered command handling in accordance with examples as disclosed herein. The memory device 520 may be an example of aspects of a memory device as described with reference to FIGS. 1 through 4. The memory device 520, or various components thereof, may be an example of means for performing various aspects of improved implicit ordered command handling as described herein. For example, the memory device 520 may include a command receiver 525, a relative order determination component 530, a memory access procedure selection component 535, a memory access procedure performing component 540, a parameter receiver 545, an erasing component 550, a mode configuration component 555, or any combination thereof. Each of these components may communicate, directly or indirectly, with one another (e.g., via one or more buses).

The command receiver 525 may be configured as or otherwise support a means for receiving, from a host device, a first command and a second command. The relative order determination component 530 may be configured as or otherwise support a means for determining whether a first memory operation associated with the first command and a second memory operation associated with the second command are to be performed in an order relative to each other based at least in part on a first time at which (e.g., when) the first command is received relative to a second time at which (e.g., when) the second command is received. The memory access procedure selection component 535 may be configured as or otherwise support a means for selecting whether to perform a first memory access procedure or a second memory access procedure based at least in part on whether the first memory operation and the second memory operation are a same type of memory operation and on whether the first memory operation and the second memory operation are to be performed in the order relative to each other. The memory access procedure performing component 540 may be configured as or otherwise support a means for performing the first memory access procedure or the second memory access procedure based at least in part on the selecting.

In some examples, the first command may indicate to erase one or more first bits at one or more first addresses of an address space and the second command may indicate to erase one or more second bits at one or more second addresses of the address space. In some such examples, to support performing the first memory access procedure, the parameter receiver 545 may be configured as or otherwise support a means for receiving, from the host device, one or more parameters associated with erasing the one or more second bits at the one or more second addresses of the address space. In some examples, to support performing the first memory access procedure, the erasing component 550 may be configured as or otherwise support a means for erasing, from the memory device during a duration that at least partially overlaps with receiving the one or more parameters, the one or more first bits from the one or more first addresses of the address space.

In some examples, to support performing the second memory access procedure, the parameter receiver 545 may be configured as or otherwise support a means for receiving, from the host device, one or more second parameters associated with erasing the one or more second bits at the one or more second addresses of the address space. In some examples, to support performing the second memory access procedure, the erasing component 550 may be configured as or otherwise support a means for erasing, from the memory device during a first duration that is exclusive of a second duration for receiving the one or more second parameters, the one or more first bits from the one or more first addresses of the address space.

In some examples, the first command may indicate to erase one or more first bits at one or more first addresses of an address space and the second command may indicate to erase one or more second bits at one or more second addresses of the address space. In some such examples, to support performing the first memory access procedure, the parameter receiver 545 may be configured as or otherwise support a means for receiving, from the host device, one or more first parameters associated with erasing the one or more first bits at the one or more first addresses of the address space. In some examples, to support performing the first memory access procedure, the erasing component 550 may be configured as or otherwise support a means for transmitting, to the host device during a duration that at least partially overlaps with receiving the one or more first parameters, a request for one or more second parameters associated with erasing the one or more second bits at the one or more second addresses of the address space.

In some examples, to support performing the second memory access procedure, the parameter receiver 545 may be configured as or otherwise support a means for receiving, from the host device, the one or more first parameters associated with erasing the one or more first bits at the one or more first addresses of the address space. In some examples, to support performing the second memory access procedure, the erasing component 550 may be configured as or otherwise support a means for transmitting, to the host device during the first duration that is exclusive of a second duration for receiving the one or more first parameters, a second request for one or more fourth parameters associated with erasing the one or more second bits at the one or more second addresses of the address space.

In some examples, the first command may indicate to configure a first mode for one or more first addresses of an address space and the second command may indicate to configure a second mode for one or more second addresses of the address space. In some such examples, to support performing the first memory access procedure, the parameter receiver 545 may be configured as or otherwise support a means for receiving, from the host device, one or more parameters associated with configuring the second mode for the one or more second addresses of the address space. In some examples, to support performing the first memory access procedure, the mode configuration component 555 may be configured as or otherwise support a means for configuring, during a duration that at least partially overlaps with receiving the one or more parameters, the first mode for the one or more first addresses of the address space.

In some examples, to support performing the second memory access procedure, the parameter receiver 545 may be configured as or otherwise support a means for receiving, from the host device, one or more second parameters associated with configuring the second mode for the one or more second addresses of the address space. In some examples, to support performing the second memory access procedure, the mode configuration component 555 may be configured as or otherwise support a means for configuring, during a first duration that is exclusive of a second duration for receiving the one or more second parameters, the first mode for the one or more first addresses of the address space, where the one or more second parameters are received during the first duration that is exclusive of configuring the first mode for the one or more first addresses of the address space.

In some examples, the first command may indicate to configure a first mode for one or more first addresses of an address space and the second command may indicate to configure a second mode for one or more second addresses of the address space. In some such examples, to support performing the first memory access procedure, the parameter receiver 545 may be configured as or otherwise support a means for receiving, from the host device, one or more first parameters associated with configuring the first mode for the one or more first addresses of the address space. In some examples, to support performing the first memory access procedure, the mode configuration component 555 may be configured as or otherwise support a means for transmitting, to the host device during that at least partially overlaps with receiving the one or more first parameters, a request for one or more second parameters associated with configuring the second mode for the one or more second addresses of the address space.

In some examples, to support performing the second memory access procedure, the parameter receiver 545 may be configured as or otherwise support a means for receiving, from the host device, one or more third parameters associated with configuring the first mode for the one or more first addresses of the address space. In some examples, to support performing the second memory access procedure, the mode configuration component 555 may be configured as or otherwise support a means for transmitting, to the host device during a first duration that is exclusive of a second duration for receiving the one or more third parameters, a second request for one or more fourth parameters associated with configuring the second mode for the one or more second addresses of the address space.

Figure 6:
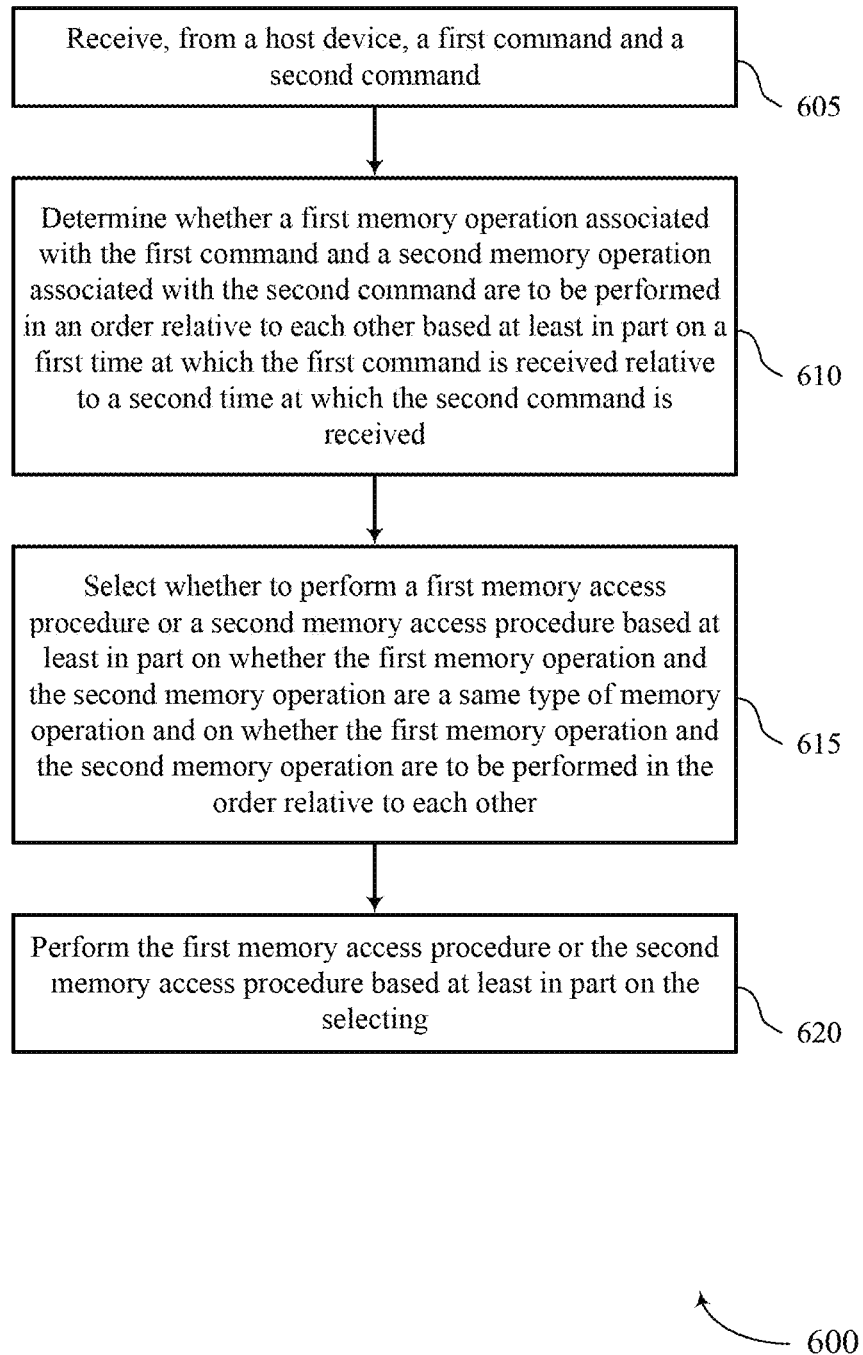
FIG. 6 shows a flowchart illustrating a method or methods that support improved implicit ordered command handling in accordance with examples as disclosed herein.

FIG. 6 shows a flowchart illustrating a method 600 that supports improved implicit ordered command handling in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 605, the method may include receiving, from a host device, a first command and a second command. The operations of 605 may be performed in accordance with examples as disclosed herein. In some examples, aspects of the operations of 605 may be performed by a command receiver 525 as described with reference to FIG. 5.

At 610, the method may include determining whether a first memory operation associated with the first command and a second memory operation associated with the second command are to be performed in an order relative to each other based at least in part on a first time at which (e.g., when) the first command is received relative to a second time at which (e.g., when) the second command is received. The operations of 610 may be performed in accordance with examples as disclosed herein. In some examples, aspects of the operations of 610 may be performed by a relative order determination component 530 as described with reference to FIG. 5.

At 615, the method may include selecting whether to perform a first memory access procedure or a second memory access procedure based at least in part on whether the first memory operation and the second memory operation are a same type of memory operation and on whether the first memory operation and the second memory operation are to be performed in the order relative to each other. The operations of 615 may be performed in accordance with examples as disclosed herein. In some examples, aspects of the operations of 615 may be performed by a memory access procedure selection component 535 as described with reference to FIG. 5.

At 620, the method may include performing the first memory access procedure or the second memory access procedure based at least in part on the selecting. The operations of 620 may be performed in accordance with examples as disclosed herein. In some examples, aspects of the operations of 620 may be performed by a memory access procedure performing component 540 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving, from a host device, a first command and a second command, determining whether a first memory operation associated with the first command and a second memory operation associated with the second command are to be performed in an order relative to each other based at least in part on a first time at which the first command is received relative to a second time at which the second command is received, selecting whether to perform a first memory access procedure or a second memory access procedure based at least in part on whether the first memory operation and the second memory operation are a same type of memory operation and on whether the first memory operation and the second memory operation are to be performed in the order relative to each other, and performing the first memory access procedure or the second memory access procedure based at least in part on the selecting.

In some examples of the method 600 and the apparatus described herein, the first command may indicate to erase one or more first bits at one or more first addresses of an address space and the second command may indicate to erase one or more second bits at one or more second addresses of the address space. In some examples of the method 600 and the apparatus described herein, performing the first memory access procedure may include operations, features, circuitry, logic, means, or instructions for receiving, from the host device, one or more parameters associated with erasing the one or more second bits at the one or more second addresses of the address space and erasing, from the memory device during a duration that at least partially overlaps with receiving the one or more parameters, the one or more first bits from the one or more first addresses of the address space.

In some examples of the method 600 and the apparatus described herein, performing the second memory access procedure may include operations, features, circuitry, logic, means, or instructions for receiving, from the host device, one or more second parameters associated with erasing the one or more second bits at the one or more second addresses of the address space and erasing, from the memory device during a first duration that may be exclusive of a second duration for receiving the one or more second parameters, the one or more first bits from the one or more first addresses of the address space.

In some examples of the method 600 and the apparatus described herein, the first command may indicate to erase one or more first bits at one or more first addresses of an address space and the second command may indicate to erase one or more second bits at one or more second addresses of the address space. In some examples of the method 600 and the apparatus described herein, performing the first memory access procedure may include operations, features, circuitry, logic, means, or instructions for receiving, from the host device, one or more first parameters associated with erasing the one or more first bits at the one or more first addresses of the address space and transmitting, to the host device during a duration that at least partially overlaps with receiving the one or more first parameters, a request for one or more second parameters associated with erasing the one or more second bits at the one or more second addresses of the address space.

In some examples of the method 600 and the apparatus described herein, performing the second memory access procedure may include operations, features, circuitry, logic, means, or instructions for receiving, from the host device, the one or more first parameters associated with erasing the one or more first bits at the one or more first addresses of the address space and transmitting, to the host device during a first duration that may be exclusive of a second duration for receiving the one or more first parameters, a second request for one or more fourth parameters associated with erasing the one or more second bits at the one or more second addresses of the address space.

In some examples of the method 600 and the apparatus described herein, the first command indicates to configure a first mode for one or more first addresses of an address space and the second command indicates to configure a second mode for one or more second addresses of the address space. In some examples of the method 600 and the apparatus described herein, performing the first memory access procedure may include operations, features, circuitry, logic, means, or instructions for receiving, from the host device, one or more parameters associated with configuring the second mode for the one or more second addresses of the address space and configuring, during a duration that at least partially overlaps with receiving the one or more parameters, the first mode for the one or more first addresses of the address space.

In some examples of the method 600 and the apparatus described herein, performing the second memory access procedure may include operations, features, circuitry, logic, means, or instructions for receiving, from the host device, one or more second parameters associated with configuring the second mode for the one or more second addresses of the address space and configuring, during a first duration that may be exclusive of a second duration for receiving the one or more second parameters, the first mode for the one or more first addresses of the address space, where the one or more second parameters may be received during a first duration that may be exclusive of configuring the first mode for the one or more first addresses of the address space.

In some examples of the method 600 and the apparatus described herein, the first command indicates to configure a first mode for one or more first addresses of an address space and the second command indicates to configure a second mode for one or more second addresses of the address space. In some examples of the method 600 and the apparatus described herein, performing the first memory access procedure may include operations, features, circuitry, logic, means, or instructions for receiving, from the host device, one or more first parameters associated with configuring the first mode for the one or more first addresses of the address space and transmitting, to the host device during that at least partially overlaps with receiving the one or more first parameters, a request for one or more second parameters associated with configuring the second mode for the one or more second addresses of the address space.

In some examples of the method 600 and the apparatus described herein, performing the second memory access procedure may include operations, features, circuitry, logic, means, or instructions for receiving, from the host device, one or more third parameters associated with configuring the first mode for the one or more first addresses of the address space and transmitting, to the host device during a first duration that may be exclusive of a second duration for receiving the one or more third parameters, a second request for one or more fourth parameters associated with configuring the second mode for the one or more second addresses of the address space.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory device and a controller coupled with the memory device and configured to cause the apparatus to, receive, from a host device, a first command and a second command, where the first command indicates to erase one or more first bits at one or more first addresses of an address space and the second command indicates to erase one or more second bits at one or more second addresses of the address space; receive, from the host device, one or more parameters associated with erasing the one or more second bits at the one or more second addresses of the address space; and erase, from the memory device during a duration that at least partially overlaps with receiving the one or more parameters, the one or more first bits from the one or more first addresses of the address space In some examples, the controller may be further configured to cause the apparatus to: receive, from the host device, one or more second parameters associated with erasing the one or more first bits at the one or more first addresses of the address space, where erasing the one or more first bits may be based at least in part on receiving the one or more second parameters; and transmit, to the host device, a request for the one or more parameters associated with erasing the one or more second bits at the one or more second addresses of the address space, where receiving the one or more parameters may be based at least in part on the request, and where the one or more second parameters may be received during a second duration that at least partially overlaps with transmitting the request.

In some examples, the controller may be further configured to cause the apparatus to: transmit, to the host device, a second request for the one or more second parameters, where receiving the one or more second parameters during the second duration that at least partially overlaps with transmitting the request may be based at least in part on transmitting the second request.

In some examples, the controller may be further configured to cause the apparatus to: determine whether the first command and the second command may be to be performed in an order relative to each other, where the duration for erasing the one or more first bits at least partially overlapping with receiving the one or more parameters may be based at least in part on determining that the first command and the second command may be to be performed in the order relative to each other.

In some examples, the controller may be further configured to cause the apparatus to: transmit, to the host device, a first indication that the one or more first bits may have been erased, erase, from the memory device and after transmitting to the host device the first indication that the one or more first bits may have been erased, the one or more second bits from the one or more second addresses of the address space, and transmit, to the host device, a second indication that the one or more second bits may have been erased.

In some examples of the apparatus, the first indication that the one or more first bits may have been erased may be transmitted during a second duration that does not overlap with receiving the one or more parameters.

In some examples of the apparatus, the duration for erasing the one or more first bits at least partially overlapping with receiving the one or more parameters may be based at least in part on the first command and the second command corresponding to a same type of command.

In some examples of the apparatus, the memory device includes or is an example of a NOT-AND (NAND) memory device.

Another apparatus is described. The apparatus may include a memory device and a controller coupled with the memory device and configured to cause the apparatus to: receive, from a host device, a first command and a second command, where the first command indicates to erase a one or more first bits at one or more first addresses of an address space and the second command indicates to erase a one or more second bits at one or more second addresses of the address space; receive, from the host device, one or more first parameters associated with erasing the one or more first bits at the one or more first addresses of the address space; and transmit, to the host device during a duration that at least partially overlaps with receiving the one or more first parameters, a request for one or more second parameters associated with erasing the one or more second bits at the one or more second addresses of the address space.

In some examples, the controller may be further configured to cause the apparatus to: receive, from the host device, the one or more second parameters based at least in part on transmitting the request for the one or more second parameters and erase, from the memory device during a second duration that at least partially overlaps with receiving the one or more second parameters, the one or more first bits from the one or more first addresses of the address space based at least in part on receiving the one or more first parameters.

In some examples, the controller may be further configured to cause the apparatus to: transmit, to the host device, a first indication that the one or more first bits may have been erased, erase, from the memory device after transmitting to the host device the first indication that the one or more first bits may have been erased, the one or more second bits from the one or more second addresses of the address space, and transmit, to the host device, a second indication that the one or more second bits may have been erased.

In some examples of the apparatus, the first indication that the one or more first bits may have been erased may be transmitted during a third duration that does not overlap with receiving the one or more second parameters.

In some examples, the controller may be further configured to cause the apparatus to: transmit, to the host device, a second request for the one or more first parameters, where receiving the one or more first parameters during the duration that at least partially overlaps with transmitting the request may be based at least in part on transmitting the second request.

In some examples, the controller may be further configured to cause the apparatus to: determine whether the first command and the second command may be to be performed in an order relative to each other, where the duration for receiving the one or more first parameters at least partially overlapping with transmitting the request for the one or more second parameters may be based at least in part on determining that the first command the second command may be to be performed in the order relative to each other.

In some examples of the apparatus, the duration for receiving the one or more first parameters at least partially overlapping with transmitting the request for the one or more second parameters may be based at least in part on the first command and the second command corresponding to a same type of command.

In some examples of the apparatus, the memory device includes a NOT-AND memory device.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on or in response to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent each of the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
receive a first command and a second command, wherein the first command indicates a first operation associated with one or more first addresses of an address space of a memory device of the one or more memory devices and the second command indicates a second operation associated with one or more second addresses of the address space of the memory device;
receive one or more first parameters associated with performing the first operation associated with the one or more first addresses of the address space; and
transmit, during a duration that at least partially overlaps with receiving the one or more first parameters, a request for one or more second parameters associated with performing the second operation associated with the one or more second addresses of the address space.

2. The memory system of claim 1, wherein the first operation is associated with erasing one or more first bits at the one or more first addresses of the address space and the second operation is associated with erasing one or more second bits at the one or more second addresses of the address space.

3. The memory system of claim 1, wherein the first operation is associated with configuring a first mode for the one or more first addresses of the address space and the second operation is associated with configuring a second mode for the one or more second addresses of the address space.

4. The memory system of claim 1, wherein the processing circuitry is further configured to cause the memory system to:
receive the one or more second parameters in response to transmitting the request for the one or more second parameters; and
perform, during a duration that at least partially overlaps with receiving the one or more second parameters, the first operation in accordance with the one or more first parameters.

5. The memory system of claim 4, wherein the processing circuitry is further configured to cause the memory system to:
transmit a first indication that the first operation is complete;
perform, after transmitting the first indication that the first operation is complete, the second operation in accordance with the one or more second parameters; and
transmit a second indication that the second operation is complete.

6. The memory system of claim 4, wherein the duration for performing the first operation at least partially overlapping with receiving the one or more second parameters is in response to the first command and the second command corresponding to a same type of command.

7. The memory system of claim 4, wherein the processing circuitry is further configured to cause the memory system to:
determine whether the first command and the second command are to be performed in a sequential order, wherein the duration for performing the first operation at least partially overlapping with receiving the one or more second parameters is in accordance with determining that the first command and the second command are to be performed in the sequential order.

8. The memory system of claim 1, wherein the processing circuitry is further configured to cause the memory system to:
  transmit, prior to receiving the one or more first parameters, a second request for the one or more first parameters associated with performing the first operation, wherein receiving the one or more first parameters during the duration that at least partially overlaps with transmitting the request is in response to transmitting the second request.

9. The memory system of claim 1, wherein the processing circuitry is further configured to cause the memory system to:
  select whether to perform a first memory access procedure or a second memory access procedure in response to a determination of whether the first operation and the second operation are a same type of operation and whether the first operation and the second operation are to be performed in a sequential order; and
  perform the first memory access procedure or the second memory access procedure in accordance with selecting whether to perform the first memory access procedure or the second memory access procedure.

10. The memory system of claim 1, wherein the memory device comprises a NOT-AND (NAND) memory device.

11. A non-transitory computer-readable medium storing code comprising instructions which, when executed by processing circuitry of a memory system, cause the memory system to:
  receive a first command and a second command, wherein the first command indicates a first operation associated with one or more first addresses of an address space of a memory device of the memory system and the second command indicates a second operation associated with one or more second addresses of the address space of the memory device;
  receive one or more first parameters associated with performing the first operation associated with the one or more first addresses of the address space; and
  transmit, during a duration that at least partially overlaps with receiving the one or more first parameters, a request for one or more second parameters associated with performing the second operation associated with the one or more second addresses of the address space.

12. The non-transitory computer-readable medium of claim 11, wherein the first operation is associated with erasing one or more first bits at the one or more first addresses of the address space and the second operation is associated with erasing one or more second bits at the one or more second addresses of the address space.

13. The non-transitory computer-readable medium of claim 11, wherein the first operation is associated with configuring a first mode for the one or more first addresses of the address space and the second operation is associated with configuring a second mode for the one or more second addresses of the address space.

14. The non-transitory computer-readable medium of claim 11, wherein the instructions, when executed by the processing circuitry of the memory system, further cause the memory system to:
  receive the one or more second parameters in response to transmitting the request for the one or more second parameters; and
  perform, during a duration that at least partially overlaps with receiving the one or more second parameters, the first operation in accordance with the one or more first parameters.

15. The non-transitory computer-readable medium of claim 14, wherein the instructions, when executed by the processing circuitry of the memory system, further cause the memory system to:
  transmit a first indication that the first operation is complete;
  perform, after transmitting the first indication that the first operation is complete, the second operation in accordance with the one or more second parameters; and
  transmit a second indication that the second operation is complete.

16. The non-transitory computer-readable medium of claim 14, wherein the duration for performing the first operation at least partially overlapping with receiving the one or more second parameters is in response to the first command and the second command corresponding to a same type of command.

17. The non-transitory computer-readable medium of claim 14, wherein the instructions, when executed by the processing circuitry of the memory system, further cause the memory system to:
  determine whether the first command and the second command are to be performed in a sequential order, wherein the duration for performing the first operation at least partially overlapping with receiving the one or more second parameters is in accordance with determining that the first command and the second command are to be performed in the sequential order.

18. The non-transitory computer-readable medium of claim 11, wherein the instructions, when executed by the processing circuitry of the memory system, further cause the memory system to:
  transmit, prior to receiving the one or more first parameters, a second request for the one or more first parameters associated with performing the first operation, wherein receiving the one or more first parameters during the duration that at least partially overlaps with transmitting the request is in response to transmitting the second request.

19. The non-transitory computer-readable medium of claim 11, wherein the instructions, when executed by the processing circuitry of the memory system, further cause the memory system to:
  select whether to perform a first memory access procedure or a second memory access procedure in response to a determination of whether the first operation and the second operation are a same type of operation and whether the first operation and the second operation are to be performed in a sequential order; and
  perform the first memory access procedure or the second memory access procedure in accordance with selecting whether to perform the first memory access procedure or the second memory access procedure.

20. A method performed by a memory system, the method comprising:
  receiving a first command and a second command, wherein the first command indicates a first operation associated with one or more first addresses of an address space of a memory device of the memory system and the second command indicates a second operation associated with one or more second addresses of the address space of the memory device;
  receiving one or more first parameters associated with performing the first operation associated with the one or more first addresses of the address space; and
  transmitting, during a duration that at least partially overlaps with receiving the one or more first parameters, a request for one or more second parameters associated with performing the second operation associated with the one or more second addresses of the address space.

* * * * *